(12) United States Patent
Kulick

(10) Patent No.: US 7,103,746 B1
(45) Date of Patent: Sep. 5, 2006

(54) METHOD OF SPARING MEMORY DEVICES CONTAINING PINNED MEMORY

(75) Inventor: Stanley S. Kulick, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 324 days.

(21) Appl. No.: 10/749,935

(22) Filed: Dec. 31, 2003

(51) Int. Cl.
*G06F 12/00* (2006.01)
*G06F 9/00* (2006.01)

(52) U.S. Cl. ....................... 711/173; 711/161
(58) Field of Classification Search ............... 711/173, 711/161
See application file for complete search history.

(56) References Cited

U.S. PATENT DOCUMENTS

| | | | | |
|---|---|---|---|---|
| 4,797,853 A | * | 1/1989 | Savage et al. ............... 710/22 |
| 5,117,350 A | * | 5/1992 | Parrish et al. ............... 711/1 |
| 5,537,112 A | * | 7/1996 | Tsang ............................ 341/59 |
| 6,381,715 B1 | * | 4/2002 | Bauman et al. .............. 714/718 |
| 6,415,364 B1 | * | 7/2002 | Bauman et al. .............. 711/155 |

* cited by examiner

*Primary Examiner*—Tuan V. Thai
*Assistant Examiner*—Lev Iwashko
(74) *Attorney, Agent, or Firm*—Troutman Sanders LLP; Gerald R. Boss; James Hunt Yancey, Jr.

(57) ABSTRACT

Embodiments of the present invention may provide a method of sparing and removing pinned or interleaved memory. When a memory device failure is predicted in a device containing pinned memory, a request may be made for the de-allocation of a freeable memory range 304. When the request for de-allocating the freeable range of memory is accepted 306, the memory data from the failing memory device may be copied to one or more de-allocated memory devices 308. Requests directed to the failing memory device may be re-routed to the replacement memory device(s) 310 and the memory without the deactivated memory device 312 may be re-interleaved.

22 Claims, 6 Drawing Sheets

METHOD OF SPARING MEMORY DEVICES CONTAINING PINNED MEMORY

BACKGROUND OF THE INVENTION

A primary concern of server computer memory performance is the throughput of the memory devices employed because oftentimes the large number of instructions received from networked terminals must be processed virtually simultaneously. The throughput of a memory device or "bank" is limited by the time necessary for a processor to access the data stored in the device. The average time necessary to access information from a memory device is determined by the physical limitations of the storage medium, operating system, processor speed and other factors. This time is known as the memory device cycle time. Multiple accesses are typically in progress to different memory devices at the same time. However, after a cycle has begun for a particular memory device, other functions, such as responding to an access request or retrieving requested data, may be blocked until the cycle is completed.

Typically, server computer memories are "interleaved" to prevent delays from multiple accesses to a particular memory device. Interleaving can be defined as choosing to select memory devices with address bits such that typical address streams are spread across multiple memory devices rather than a single one. An interleaved memory with n memory devices is said to be "n-way interleaved." Each of the contiguous memory devices is mapped to a virtual address that may be interpreted by an operating system, address decoder or other system specific software.

Incoming memory instructions tend to be "local" in that they oftentimes call for accessing contiguous addresses in a memory array. For example, a first request may be for memory location N, a second at location N+1, a third at N+2, and so on, wherein N, N+1 and N+2 may be mapped to consecutive virtual address locations. For desktop computer memory controllers, it is typically acceptable to map N, N+1, N+2, etc. to consecutive locations on the same memory device as there may only be one or two request streams at a time. However, it is impractical to map consecutive memory locations to the same memory device in a server computer because the volume of requests being received from multiple terminals would likely result in access delays. Instead, interleaving provides for increasing the bandwidth capability of a server computer memory by allocating contiguous memory requests among multiple memory devices. As such, consecutive requests may be addressed to noncontiguous physical memory locations. Therefore, when one memory device receives a request and is opened to process the request, another memory device may receive the next request so that the first and second requests may be processed without undue delay. With enough memory devices, by the time each memory device receives an instruction, the first device should have completed its cycle time and should therefore be ready to process a new instruction.

Various advanced interleaving strategies exist for server computer applications. For example, an interleaved memory may be partitioned into separate regions so that, in the case of a memory device failure, damage may be isolated to a particular region rather than jeopardizing the operation of the entire memory. Typically, a first region may contain "pinned memory" addresses for fixed, "non-freeable" data, such as an operating system structure that must remain resident in main memory for a program to perform adequately. A second region may contain "freeable" memory addresses for data that can be written to an external location, such as to a disk.

As with all physical components, memory devices occasionally fail. There are many methods for predicting a memory device failure. For example, a memory device failure may be predicted by evidence of overheating or an abnormally high error rate. When a memory device is determined to be failing, software may request the removal of the failing memory device from the system memory map. When the memory device is removed from the memory map, the data from the failing memory device is copied to one or more replacement memory devices in a technique called "memory sparing." After the memory data is copied to one or more operational memory devices, the address of the failing memory device is remapped to the new memory device(s) containing the data. Memory sparing can be performed without interrupting the normal operation of the memory devices, but typically requires additional unused (or "spare") memory devices to be available for when a memory device failure is detected.

While it is possible to predict the failure of and spare a failing memory device generally, there are unique problems associated with sparing a device containing memory which may not be de-allocated, or "pinned memory". First, as explained above, interleaved memory address locations are not contiguous. For example, address location N may be physically allocated to a memory device A, N+1 to a memory device B, N+2 to a memory device C, and so on. Therefore, each memory device may contain data that is essential to the operation of the interleaved memory as a whole. A failure of a given memory device can take out very large portions of, or possibly an entire memory address range. In another example, a particular physical memory device in an interleaved memory may contain every jth cache memory line, wherein j may be the number of memory devices in the interleaved memory. Therefore, if a particular memory device fails, the data it contains cannot be removed for a period of time and then replaced later on because the data contained in the remaining memory devices would be incomplete.

Interleaving multiples the range taken out by a single device failure to the point that it is very likely that a given device failure will impact pinned memory. Despite advances in failure prediction, memory removal/addition and sparing, there is currently no reliable method available for replacing a memory device which contains pinned memory. As such, without some method of dealing with pinned memory, techniques for sparing memory devices, especially techniques for sparing interleaved memory devices, have little value.

BRIEF DESCRIPTION OF DRAWINGS

Embodiments of the present invention may be understood more fully from the detailed description given below and from the accompanying drawings of embodiments of the invention which, however, should not be taken to limit the invention to the specific embodiments described, but are for explanation and understanding only.

DETAILED DESCRIPTION OF THE INVENTION

In the following detailed description of the present invention numerous specific details are set forth in order to provide a thorough understanding of embodiments of the present invention. However, it will be apparent to one skilled in the art that embodiments of the present invention may be practiced without these specific details. In other instances, well-known structures and devices may be shown in block diagram form, rather than in detail, in order to avoid obscuring the present invention.

Reference in the specification to "one embodiment" or "an embodiment" means that a particular feature, structure, or characteristic described in connection with an embodiment may be included in at least one embodiment of the invention. The appearances of the phrase "in one embodiment" in various places in the specification may not necessarily be referring to the same embodiment.

Embodiments herein may include apparatuses for performing the operations herein. These apparatuses may be specifically constructed for the desired purposes, or they may comprise a general purpose computing device selectively activated or reconfigured by a program stored in the device. Such a program may be stored on a storage medium, such as, but not limited to, any type of disk including floppy disks, optical disks, CD-ROMs, magnetic-optic disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes presented herein may not be inherently related to any particular computing device or other apparatus. Various general purpose systems may be used with programs in accordance with the teachings herein, or it may prove convenient to construct a more specialized apparatus. In addition, embodiments of the present invention may not be described with reference to any particular programming language. It will be appreciated that a variety of programming languages may be used to implement embodiments of the present invention as described herein.

Figure 1:
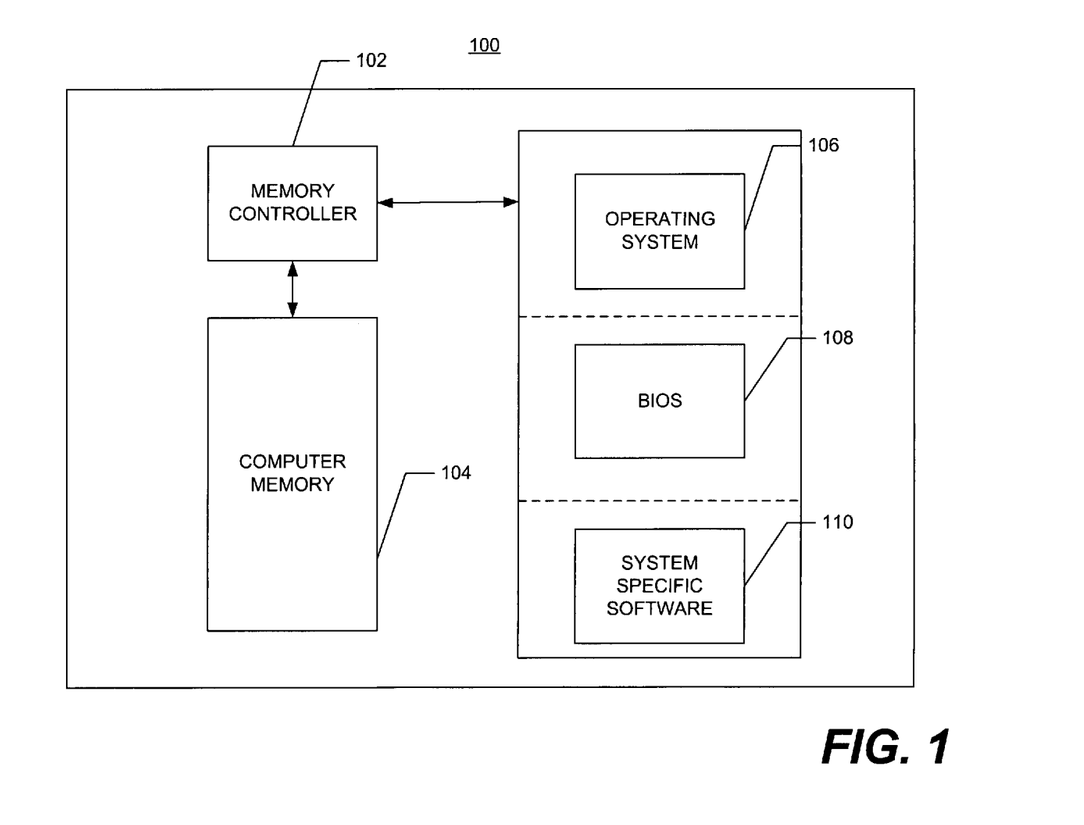
FIG. 1 illustrates a basic diagram of a computer system on which embodiments of the invention may be implemented.

FIG. 1 illustrates one embodiment of a computer system 100 on which the present invention may be implemented. Unless specifically stated otherwise, as apparent from the following discussions, it is appreciated that throughout the specification discussions utilizing terms such as "predicting," "monitoring," "determining," "searching," or the like, may refer to the action and/or processes of the computer system 100 or the various components of the computer system 100, or a similar electronic computing device, that may manipulate and/or transform data represented as physical, such as electronic, quantities within the computer system's 100 registers and/or memories into other data similarly represented as physical qualities within the computer system's 100 memories, registers or other such information storage, transmission or display devices. In one embodiment, the computer system 100 may include a memory controller 102 for performing actions and/or processes in a computer memory 104. The computer system 100 may also include an operating system 106, a basic input/output system ("BIOS") 108 and system specific software 110. The system-specific software 110 may manage data flow between the operating system 106 and the memory controller 102 and other attached hardware, software, and/or firmware (not shown) such as a processing unit, a memory device, or a network interface, a memory device, a user input interface or the like.

Figure 2:
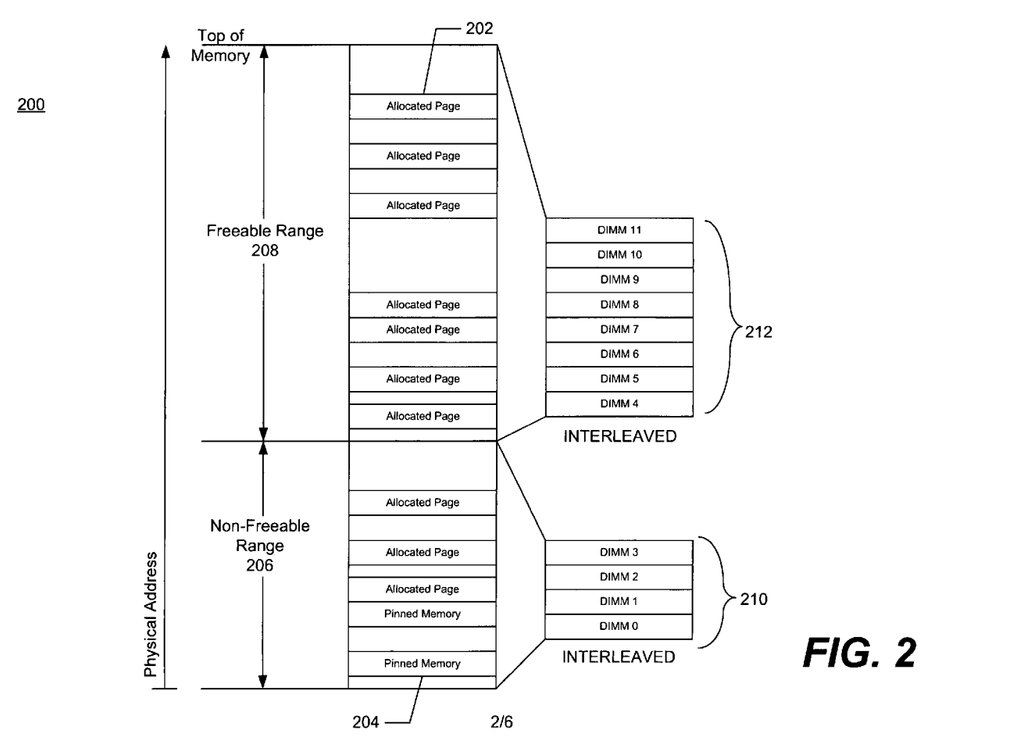
FIG. 2 is a block diagram of a memory map representing various embodiments of the invention.

Referring now to FIG. 2, a memory map 200 may illustrate the physical address space in a computer memory 104 from address "zero" to the top of the memory. As shown, the memory may be "allocated" 202, or used, by the operating system and other system applications. There may be gaps among the allocated pages 202 in the address space representing portions of the physical address space that are not allocated. However, it should be noted that while the gaps between the allocated pages 202 are shown in FIG. 2 for clarity, allocated pages 202 may typically constitute the vast majority of physical address space.

The physical address space may also include "pinned memory" address space 204. Pinned memory 204 may comprise operating system structures and other memory data such as, for example and not limitation, data for a page table or an application kernel, which may or should remain resident in main memory for the operation of a program. Therefore, pinned memory 204 may not be copied to an external storage device such as a disk. This fact may severely limit the potential for successfully sparing a failing memory device containing pinned memory data. Sparing may improve memory reliability by detecting a memory device failure and copying the memory data in the failing memory device into one or more operational memory devices before the failing memory device fails completely. The data-locating address formerly routed to the failing memory device may be re-routed to the new device(s) containing the data when the data transfer is complete, thus making the effects of sparing transparent to the normal operation of retrieving data from the memory.

The physical address space in map 200 may be further partitioned into a non-freeable range 206 and a freeable range 208 of address space. In one embodiment, BIOS 108 may partition the physical address space in order to localize the effects of a memory device failure. For example, a memory device failure in the freeable range 208 of address space may not affect the operation of memory devices in the non-freeable range 206, or vice versa. Therefore, BIOS 108 may partition address space to optimize the memory map 200 for interleaving or other goals. In operation, BIOS 108 may map memory devices to certain ranges, for example, by setting chipset registers.

In an exemplary embodiment of the present invention, pinned memory 204 may be restricted to the smaller non-freeable range 206 of address space, which in FIG. 2 includes the Dual In-line Memory Modules ("DIMMs") 0–3 210. (For the purposes of simplicity, an exemplary embodiment of the present invention may include a memory map 200 comprising a plurality of DIMMs. However, DIMMs, Single In-line Memory Modules ("SIMMs") or other data storage media or any combination thereof may be suitable memory devices for the implementation of embodiments of the present invention.) The non-freeable range 206 of memory devices may therefore be the range of memory devices that may contain memory that cannot be spared if a memory device fails.

The freeable range 208 of address space may include DIMMs 4–11 212. In one embodiment, the individual memory devices in both the non-freeable 206 and freeable 208 ranges may vary in size (data capacity measured in bytes), however, it should be noted that the freeable range 208 of memory devices should always have at least the same total data capacity as the non-freeable range 206 for reasons described below.

While embodiments of the present invention may be implemented in any type of computing device including personal computers, server computers, hand-held or laptop devices, multiprocessor systems, microprocessor-based systems, set top boxes, programmable consumer electronics, network PCs, minicomputers, mainframe computers and distributed computing environments that may include any of the above systems or devices, one embodiment of the present invention may be a server computer that may manage a centralized main memory for processing incoming instructions from remotely networked terminals. Typically, a server computer memory may comprise interleaved memory devices to maximize bandwidth capabilities for processing multiple incoming requests from remote terminals. In one embodiment, the memory devices may be interleaved based on powers of two. For example, the twelve memory devices shown in FIG. 2 may be interleaved, or grouped together in a group of four memory devices 210 and a group of eight memory devices 212, both powers of 2, rather than some other combination.

Therefore, the memory map 200 that is visible to the computer operating system may comprise non-freeable 206 and freeable 208 ranges of interleaved memory devices, wherein the total data capacity of the freeable range 208 memory devices may be equal to or greater than the total data capacity of the non-freeable range 206 of memory devices.

Figure 3:
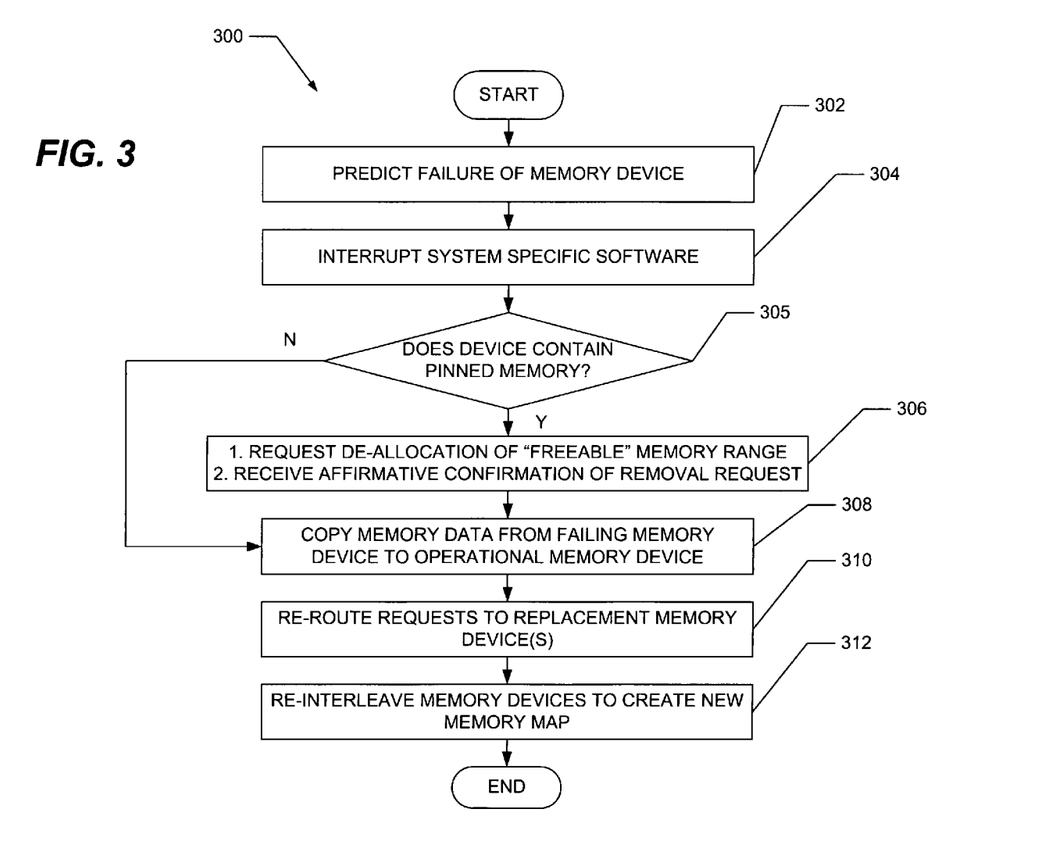
FIG. 3 illustrates a flowchart representing the basic operation of an embodiment of the invention.

FIG. 3 is a flow chart representation 300 of the operation of the memory controller 102 for sparing a failing memory device in the non-freeable range 206 (i.e., a memory device that may contain pinned memory). It should be noted that while the functions herein may be described as being carried out by the memory controller 102, several components, including the memory controller 102, operating system 106, BIOS 108, run-time software, application software, hardware, firmware, or any combination thereof, may be designed to carry out the functions herein without detracting from the scope and spirit of embodiments of the present invention.

In block 302, the memory controller 102 may predict the failure of a memory device. There are several ways in which the memory controller 102 may predict the failure of a memory device that may still be operating in some capacity. For example, the memory controller 102 may determine the number of reparable errors that occur for a particular memory device by monitoring and logging error occurrences. Alternatively, the operating system, firmware and/or a software run-time application that is interfaced with the memory controller 102 may monitor and/or log memory device errors. Reparable errors may include flipped bits, timed out requests or other functions of the memory device that may be indicative of abnormal operation. In one embodiment, the memory controller 102 may keep track of an error rate for each memory device and may alert the operating system when a memory device exceeds a threshold number of errors. Alternatively, the memory controller 102 may interrupt the operating system 106 each time an error occurs. The operating system 106 may then keep track of a high error rate memory device. The number of errors necessary to trigger an alert may be a fixed or programmable threshold.

Alternatively or in addition to monitoring errors for evidence of a possible memory device failure, the memory controller 102, operating system 106 and/or an external application program may monitor the operating temperature of a memory device. If the operating temperature for a memory device exceeds a predetermined threshold, the memory controller 102 may signal to the operating system 106 that a memory device failure may be imminent or in progress. The operating temperature necessary to trigger an alert may be a fixed or programmable threshold value. As such, a threshold temperature that may be indicative of a memory device failure would be known to one skilled in the art of memory device design.

It should be appreciated that there may be numerous other ways in which a memory controller 102 may be able to determine whether a memory device may be failing, therefore, the examples of temperature and error monitoring, while illustrative, should not limit the scope of embodiments of the present invention with regard to memory device failure prediction.

Figure 4:
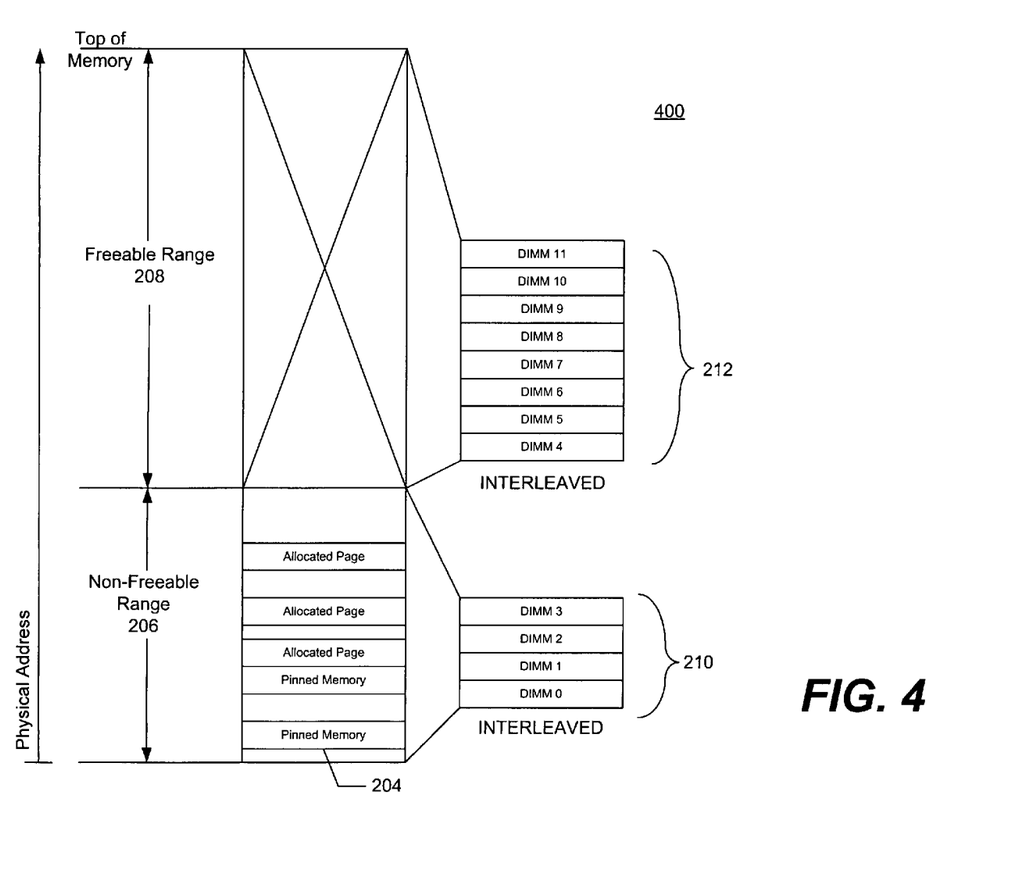
FIG. 4 is a block diagram of a memory map representing various embodiments of the invention.

In block 304, after a memory device is determined to be failing or susceptible to failure, the memory controller 102 may interrupt the system-specific software 110. The system-specific software 110 may request permission from the operating system 106 to de-allocate the freeable range 208 of memory devices, as illustrated on the memory map 200 in FIG. 4. The operating system 106 may be operable to add and remove memory components from the memory map 200. Various operating systems 106 may add or remove memory devices from the memory map 200 according to the functions described herein. In an alternative embodiment, the memory controller 102, or another component, may determine whether a memory device may be added or removed.

Typically, the operating system 106 may determine whether the requested memory ranges may be removed from the memory map 200. For example, the operating system 106 may not remove a memory range if it contains pinned memory data. In block 305, the operating system 106 may determine whether the range of memory supported by the failing memory device contains pinned memory 204. If the requested memory range does not contain pinned memory, the operating system 106 may copy the requested memory range to at least one operational memory device in block 308. However, if the requested memory range does contain pinned memory in block 305, the removal operation may still be performed. If the requested range contains pinned memory, the system-specific software 110 may request for the operating system to de-allocate only the freeable range 208, which does not contain pinned memory in block 306. Therefore, the request may yield an affirmative response to the removal request from the operating system 106.

Figure 5:
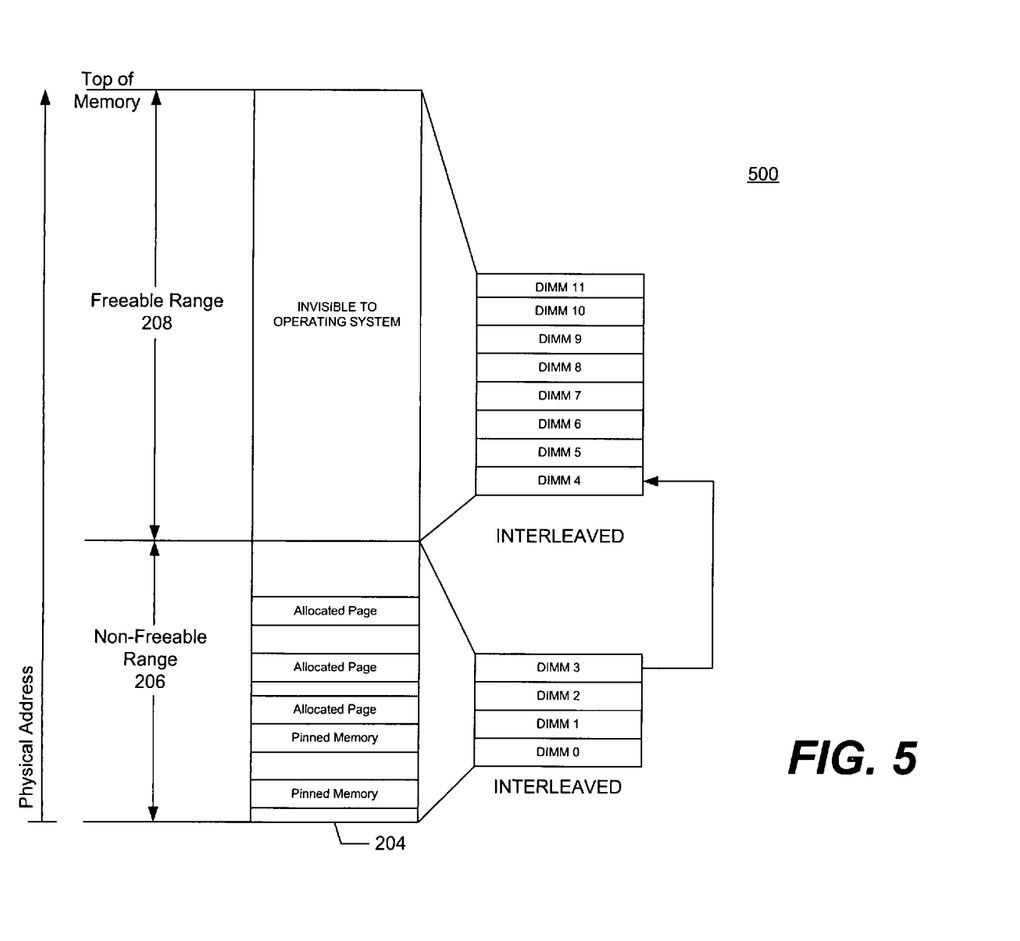
FIG. 5 is a block diagram of a memory map representing various embodiments of the invention.

In block 306, the memory controller 102 may receive an affirmative confirmation from the operating system 106 that the freeable range 208 of memory devices may be de-allocated. After an affirmative confirmation is received, the memory controller 102 may copy the memory data from the failing memory device into one or more of the de-allocated operational memory devices in block 308. This operation is illustrated in FIG. 5 wherein the contents of failed memory device DIMM3 may be copied to DIMM4. The memory data from the failing memory device may be copied to an operational memory device in the freeable range 208 because the freeable range 208 may always have the storage capacity to accept the memory data from the non-freeable range 206. For example, even during the rare occurrence of a failure of multiple (or all) memory devices in the non-freeable 206 range, the memory data from all of the failing devices may be spared to de-allocated memory of the freeable range 208 because the memory controller 102 may always allocate more storage capacity to the freeable 208 range. It should be noted that if pinned memory is transferred to freeable space, it may no longer be freeable.

In one embodiment, the memory controller 102 may search the de-allocated memory devices for a memory device that is suitable in size to accept the data from the failing memory device. When a de-allocated memory device with a large enough capacity is located, the memory controller 102 may copy the memory data from the failing memory device to the de-allocated memory device.

The address of the failing memory device may be re-routed to the one or more memory devices to which the memory data from the failing memory device was transferred. This may be done in a number of ways. For example, a processor may comprise a memory address decoder for converting a virtual address location of a memory device, which may typically be unknown to the operating system 106, into a physical address location for the memory device. As such, the operation of converting from a virtual address location to a physical address location may not interrupt the normal operation of the operating system 106. When the copying operation is complete, the memory controller 102 may re-route requests from the failing memory device to the replacement memory device(s) in block 310.

Figure 6:
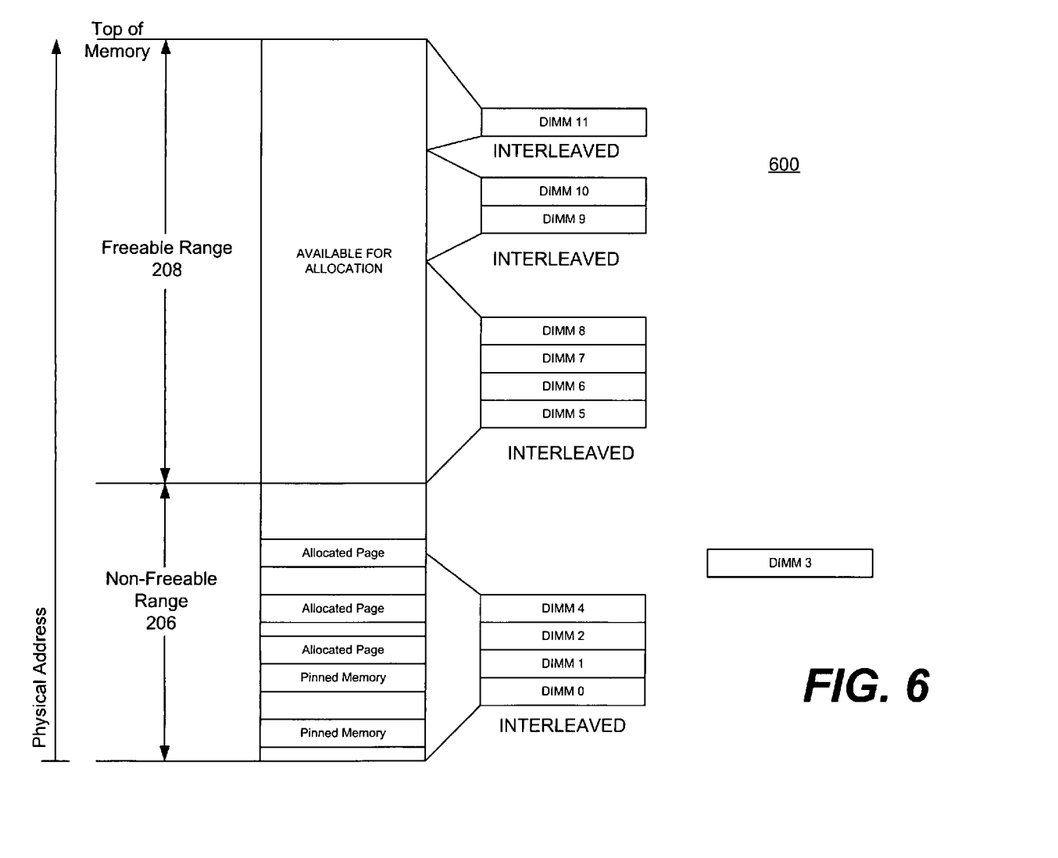
FIG. 6 is a block diagram of a memory map representing various embodiments of the invention.

In block 312, the memory controller 102 may re-interleave the memory without including the failing memory device. For example, just as during start-up, the memory controller 102 may optimize the available memory devices for interleaving as shown in FIG. 6. It should be noted that the operating devices in the interleave of the failing device may not be used to receive the copy. However, after the data is copied, they may be combined into new interleaves that may be added to the memory map 200. For example, the eleven remaining memory devices, seven in the freeable range 208 and four in the non-freeable range 206, are interleaved by powers of 2 into groupings of one, two and four in the freeable range 208 and four in the non-freeable range 206. The total memory available in the freeable range 208 depicted in FIG. 6 may thus be reduced by the amount of memory previously provided by the failed memory device.

In an alternative embodiment of the present invention, some or all of the functions and features described above may be implemented by a user who may enter commands and information into the computer to perform the functions of the present invention through input devices (not shown) such as a keyboard and mouse, trackball, touch pad, microphone, joystick, game pad, satellite dish, scanner, or the like. These and other input devices are often connected to a processing unit through an interface that is coupled to the system bus, but may be connected by other interface and bus structures, such as a parallel port, game port or a universal serial bus (USB). A user may also have a monitor, printer or other display and peripheral devices to monitor and record some or all of the functions and features of the present invention.

The present invention has been described in relation to particular embodiments, which are intended in all respects to be illustrative rather than restrictive. Alternate embodiments will become apparent to those skilled in the art to which the present invention pertains without departing from its spirit and scope.

I claim:

1. A method, comprising:
   partitioning a computer memory into a freeable range and a non-freeable range of operating memory devices, wherein pinned memory is confined to the non-freeable range and the operating memory devices in the freeable range constitute at least the same number of bytes as the operating memory devices in the non-freeable range;
   de-allocating at least a portion of the freeable range of memory devices; and
   copying contents of a memory range supported by a memory device that holds pinned memory to at least one de-allocated memory device; and re-routing data requests destined for the memory device that holds pinned memory to the at least one de-allocated memory device so that the requests are directed to the at least one-de allocated memory device.

2. The method of claim 1, wherein requests are re-routed to the at least one de-allocated memory device when the contents of the memory range supported by the memory device that holds pinned memory are copied.

3. The method of claim 1 further comprising re-partitioning the memory into a freeable range and a non-freeable range of operating memory devices when contents of the memory range supported by a memory device that holds pinned memory is copied.

4. The method of claim 1 further comprising interleaving the freeable range of operating memory devices when the computer memory is partitioned.

5. The method of claim 1 further comprising interleaving the non-freeable range of operating memory devices when the computer memory is partitioned.

6. The method of claim 1 further comprising detecting whether an operating memory device is failing;
   when the failing memory device holds pinned memory, de-allocating at least a portion of the freeable range of memory devices; and
   copying the contents of the memory range supported by the failing memory device to at least one de-allocated memory device.

7. The method of claim 6 wherein detecting whether an operating memory device is failing further comprises accepting at least one parameter indicative of a memory device failure based on a selected criterion for monitoring a memory device; monitoring an operating memory device and generating monitoring data indicative of whether the memory device is in compliance with the selected criterion; and determining whether the selected criterion has been met.

8. The method of claim 7 wherein the selected criterion is a temperature threshold.

9. The method of claim 7 wherein the selected criterion is a threshold error rate.

10. The method of claim 1 wherein de-allocating the freeable range of memory devices comprises issuing, by a software process, a de-allocation request, wherein the de-allocation request identifies the freeable range memory devices; receiving, at an operating system, the de-allocation request and determining whether the requested memory devices may be de-allocated; and issuing, by an operating system process, a determination of whether the requested memory devices may be de-allocated.

11. The method of claim 1 wherein copying the contents of the memory range supported by a memory device that holds pinned memory to at least one de-allocated memory device further comprises selecting at least one de-allocated memory device suitable in size to replace the memory device that holds pinned memory, wherein the memory device that holds pinned memory is configured to contain a predetermined number of bytes of data.

12. The method of claim 1 wherein copying the contents of the memory range supported by a memory device that holds pinned memory to at least one de-allocated memory device further comprises remapping an address location for the memory device that holds pinned memory to an address location for the at least one de-allocated memory device utilized for replacing the memory device that holds pinned memory.

13. A method comprising:
   issuing, by a controller process, a partition call to partition a computer memory into a freeable range and a non-freeable range of operating memory devices;
   receiving, by an operating system process, the partition call and processing the call to partition the computer memory, wherein pinned memory is confined to the non-freeable range;
   issuing, by a controller process, a de-allocation call to de-allocate the freeable range of memory devices;
   receiving, by an operating system process, the de-allocation call and processing the call to de-allocate the freeable range of memory devices;
   issuing, by an operating system process, a copying call to copy a memory range supported by a memory device containing pinned memory to at least one de-allocated memory device; and
   re-routing data requests associated with the pinned memory to the at least one de-allocated memory device so that the at least one-de allocated memory device can respond to the requests.

14. The method of claim 13 further comprising issuing, by the controller process, an interleaving call to interleave the freeable range of operating memory devices; and receiving, by the operating system process, the interleaving call and processing the call to interleave the freeable range when the memory range supported by the memory device containing pinned memory is copied to at least one de-allocated memory device.

15. The method of claim 13 further comprising issuing, by the controller process, an interleaving call to interleave the non-freeable range of operating memory devices; and receiving, by the operating system process, the interleaving call and processing the call to interleave the non-freeable range when the memory range supported by the memory device containing pinned memory is copied to at least one de-allocated memory device.

16. The method of claim 13 wherein the memory device containing pinned memory is failing.

17. The method of claim 13 wherein, collectively, the operating memory devices in the freeable range constitute at least the same number of bytes as the operating memory devices in the non-freeable range.

18. The method of claim 13 wherein the memory devices are DIMMs.

19. A system comprising:
   a partitioning component operable to partition a memory into a freeable range and a non-freeable range of operating memory devices, wherein pinned memory is confined to the non-freeable range;
   a memory controller operable to de-allocate the freeable range of memory devices and copy a memory range supported by a memory device which contains pinned memory to at least one de-allocated memory device; and
   the memory controller further operable to re-route data operations to the at least one de-allocated device so the one de-allocated device responds to the data operation.

20. The system of claim 19, wherein the memory controller is further operable to copy the memory range supported by a memory device which contains pinned memory to at least one de-allocated memory device when the memory device which contains pinned memory is failing.

21. The system of claim 19 further comprising an interleaving component operable to interleave the freeable range of operating memory devices when the memory range supported by the memory device which contains pinned memory is copied to at least one de-allocated memory device.

22. The system of claim 19 further comprising an interleaving component operable to interleave the non-freeable range of operating memory devices when the memory range supported by the memory device which contains pinned memory is copied to at least one de-allocated memory device.

* * * * *